United States Patent
Turner et al.

(10) Patent No.: US 10,553,016 B2
(45) Date of Patent: Feb. 4, 2020

(54) PHASE ALIGNED FOVEATED RENDERING

(71) Applicant: Google LLC, Mountain View, CA (US)

(72) Inventors: Eric Turner, Mountain View, CA (US); Damien Saint-Macary, Mountain View, CA (US); Behnam Bastani, Mountain View, CA (US); Haomiao Jiang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 2 days.

(21) Appl. No.: 15/813,558

(22) Filed: Nov. 15, 2017

(65) Prior Publication Data
US 2019/0147643 A1    May 16, 2019

(51) Int. Cl.
| | | |
|---|---|---|
| G06T 15/00 | (2011.01) | |
| G06T 15/20 | (2011.01) | |
| G02B 27/01 | (2006.01) | |
| G06F 3/01 | (2006.01) | |
| G06T 19/00 | (2011.01) | |
| G06F 3/0481 | (2013.01) | |

(52) U.S. Cl.
CPC ........ G06T 15/205 (2013.01); G02B 27/0172 (2013.01); G06F 3/012 (2013.01); G06F 3/013 (2013.01); G06T 19/003 (2013.01); G06F 3/04815 (2013.01)

(58) Field of Classification Search
CPC ..... G06T 15/00; G06T 15/205; G06T 19/003; G06F 3/012; G06F 3/013; G06F 3/04815
USPC ......................................................... 345/419
See application file for complete search history.

(56) References Cited

U.S. PATENT DOCUMENTS

| | | | | |
|---|---|---|---|---|
| 8,786,675 | B2* | 7/2014 | Deering | G09G 3/02 348/46 |
| 8,824,779 | B1* | 9/2014 | Smyth | G06K 9/0061 382/100 |
| 9,129,443 | B2* | 9/2015 | Gruen | G06T 15/503 |
| 9,165,399 | B2* | 10/2015 | Uralsky | G06T 15/503 |
| 9,177,413 | B2* | 11/2015 | Tatarinov | G06T 15/005 |
| 9,241,146 | B2* | 1/2016 | Neill | H04N 13/111 |
| 9,262,797 | B2* | 2/2016 | Minkin | G06T 11/40 |
| 9,311,527 | B1* | 4/2016 | Yin | G06F 3/00 |
| 10,007,118 | B2* | 6/2018 | Border | G02B 27/0176 |

(Continued)

OTHER PUBLICATIONS

Gegenfurtner KR. The interaction between vision and eye movements. Perception. Dec. 2016;45(12):1333-57.*

(Continued)

*Primary Examiner* — Phu K Nguyen (57) ABSTRACT

A display device, such as a head mounted device (HMD), displays a virtual scene. The display device includes a motion tracker for detecting rotation and/or translation of the display device. The display device also includes a processor that is configured to determine, in response to the detected, an orientation of the display device relative to a plurality of world-aligned viewing frustums that are stationary relative to the virtual scene. The processor is also configured to identify a set of those world-aligned viewing frustums that overlap with an output field of view. The processor is further configured to render pixels of the set of those world-aligned viewing frustums that overlap with an output field of view and upsample the rendered pixels to generate values of display pixels for presentation by the display device.

20 Claims, 7 Drawing Sheets

(56) References Cited

U.S. PATENT DOCUMENTS

| | | | |
|---|---|---|---|
| 10,089,790 B2* | 10/2018 | Lawson | G06T 3/0093 |
| 10,109,039 B1* | 10/2018 | Ray | G06T 3/4053 |
| 10,339,692 B2* | 7/2019 | Young | G06T 15/005 |
| 10,388,059 B2* | 8/2019 | Luebke | G06T 15/06 |
| 2006/0233459 A1 | 10/2006 | Lange et al. | |
| 2012/0269430 A1 | 10/2012 | Deskevich et al. | |
| 2014/0247277 A1 | 9/2014 | Guenter et al. | |
| 2015/0235583 A1 | 8/2015 | Schowengerdt et al. | |
| 2016/0364904 A1 | 12/2016 | Parker et al. | |
| 2017/0018121 A1 | 1/2017 | Lawson et al. | |

OTHER PUBLICATIONS

Patney A, Salvi M, Kim J, Kaplanyan A, Wyman C, Benty N, Luebke D, Lefohn A. Towards foveated rendering for gaze-tracked virtual reality. ACM Transactions on Graphics (TOG). Nov. 11, 2016;35(6):179.*

Weier M, Roth T, Kruijff E, Hinkenjann A, Pérard-Gayot A, Slusallek P, Li Y. Foveated Real-Time Ray Tracing for Head-Mounted Displays. InComputer Graphics Forum Oct. 2016(vol. 35, No. 7, pp. 289-298).*

Turner, E., Jiang, H., Saint-Macary, D. and Bastani, B., Mar. 2018. Phase-Aligned Foveated Rendering for Virtual Reality Headsets. In 2018 IEEE Conference on Virtual Reality and 3D User Interfaces (VR) (pp. 1-2). IEEE.*

Stengel M, Grogorick S, Eisemann M, Eisemann E, Magnor MA. An affordable solution for binocular eye tracking and calibration in head-mounted displays. InProceedings of the 23rd ACM international conference on Multimedia Oct. 13, 2015 (pp. 15-24). ACM.*

Lee, W. T., Chen, H. I., Chen, M. S., Shen, I. C., & Chen, B. Y. (Oct. 2017). High-resolution 360 Video Foveated Stitching for Real-time VR. In Computer Graphics Forum (vol. 36, No. 7, pp. 115-123).*

Cuervo E, Chu D. Poster: mobile virtual reality for head-mounted displays with interactive streaming video and likelihood-based foveation. InProceedings of the 14th Annual International Conference on Mobile Systems, Applications, and Services Companion Jun. 25, 2016 (pp. 130-130). ACM.*

Kim et al, Foveated AR: Dynamically-Foveated Augmented Reality Display, ACM Trans Graph., Jul. 2019.*

Guenter, Brian, Mark Finch, Steven Drucker, Desney Tan, and John Snyder. "Foveated 3D graphics." ACM Transactions on Graphics (TOG) 31, No. 6 (2012): 164.*

Final Office Action dated Nov. 2, 2018 for U.S. Appl. No. 15/467,800, 13 pages.

Non-Final Office Action dated Jul. 6, 2018 for U.S. Appl. No. 15/467,800, 24 pages.

International Search Report and Written Opinion dated Nov. 9, 2018 for PCT Application No. PCT/US2018/046611, 14 pages.

U.S. Appl. No. 15/467,800, filed Mar. 23, 2017 listing Behnam Bastani, et al., as inventors, entitled "Phase Aligned Foveated Rendering" .

International Search Report and Written Opinion dated Feb. 26, 2018 for PCT Application No. PCT/US2017/058709, 14 pages.

Anjul Patney, et al., "Towards Foveated Rendering for Gaze-Tracked Virtual Reality," ACM Transactions on Graphics (TOG), ACM, US, vol. 35, No. 6, Nov. 11, 2016, 12 pages.

Guenter, B., et al., "Foveated 3D Graphics," Microsoft Research, Nov. 2012, 14 pages.

Guenter, B., et al., "Supplement to Foveated 3D Graphics: User Study," Microsoft Research, Nov. 2012, 4 pages.

Patney, A., et al., "Perceptually-Based Foveated Virtual Reality," NVIDIA, 2016, 2 pages.

Notice of Allowance dated Jan. 24, 2019 for U.S. Appl. No. 15/467,800, 11 pages.

International Preliminary Report on Patentability dated Feb. 13, 2019 for PCT Application No. PCT/US2017/058709, 6 pages.

* cited by examiner

PHASE ALIGNED FOVEATED RENDERING

BACKGROUND

Foveated rendering exploits the falloff in acuity of the human eye at the visual periphery to conserve power and computing resources used to generate digital images for display to users, e.g., to display augmented reality (AR) or virtual reality (VR) using a head mounted device (HMD). In foveated rendering, a user's central gaze direction is determined, either as the center of a current field-of-view or using eye tracking to determine where the user is looking. The user's field-of-view is then subdivided into a high-acuity region that surrounds the central gaze direction and one or more lower-acuity regions in the visual periphery. The high-acuity region includes a portion of the field-of-view that is within a first angular distance of the central gaze direction. The angular distance from the central gaze direction is referred to as the eccentricity. The lower-acuity regions include portions of the field-of-view that are at larger eccentricities. For example, the high-acuity region can include a portion of the field-of-view that is within an eccentricity of 5-10°, which corresponds to a portion of the field-of-view that projects to a retinal region in the human eye called the fovea. Pixels are rendered at high resolution within the high-acuity region, e.g., by rendering the pixels at a resolution corresponding to the native resolution supported by the display. Pixels in the low-acuity regions at eccentricities larger than 5-10° are rendered at lower resolutions, thereby reducing the power and computing resources needed to render the pixels. The rendered pixels in the low-acuity regions can subsequently be upsampled to generate display pixels at the native resolution of the display.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Rendering pixels at low resolution in low-acuity regions of a user's field-of-view and subsequently upsampling the rendered pixels to generate higher resolution display pixels for an output image can generate visual artifacts such as aliasing artifacts. To illustrate, a change in the user's field-of-view, e.g., due to movement of the user's head while wearing an HMD, changes the mapping of the rendered pixels to the virtual scene that the user is observing because the pattern of the rendered pixels is fixed to the display. Thus, the value of each rendered pixel changes as it sweeps across the virtual scene, resulting in aliasing artifacts. Static aliasing artifacts in the low-acuity regions may not be noticeable because of falloff in acuity with eccentricity. However, the human eye remains sensitive to motion in the visual periphery. Consequently, dynamic aliasing artifacts in the low-acuity regions are very noticeable, especially when presenting moving content, and can disrupt the user's sense of immersion in the virtual scene.

The noticeability of aliasing artifacts in the low acuity regions can be reduced by aligning the low acuity regions to content of a virtual world (e.g., the virtual scene to be rendered for viewing). The aligning of the low acuity regions to the virtual world includes maintaining the position of a plurality of viewing frustums to be stationary relative to a virtual scene during motion of a display device. This process is referring to as "world-aligning" the low acuity regions. This world-aligning of the low acuity regions does not eliminate the presence of artifacts or reduce the severity of artifacts within each static image, but instead reduces the perceptibility of peripheral artifacts. A subset of the plurality of viewing frustums that overlap with an output field of view of the display device is identified for rendering. An array of pixels for each of the identified subset of the plurality of viewing frustums is rendered and upsampled to generate values of display pixels in the low acuity regions of an output image for presentation by the display device. By world-aligning the low acuity regions, rendered pixels in the low acuity regions are positioned at fixed orientations relative to the virtual scene and the display device. Accordingly, the position of artifacts in the periphery shift locations along with content as the user's field-of-view changes (e.g., due to movement of the user's head while wearing an HMD), which is less detectable than artifacts that move against content.

Figure 1:
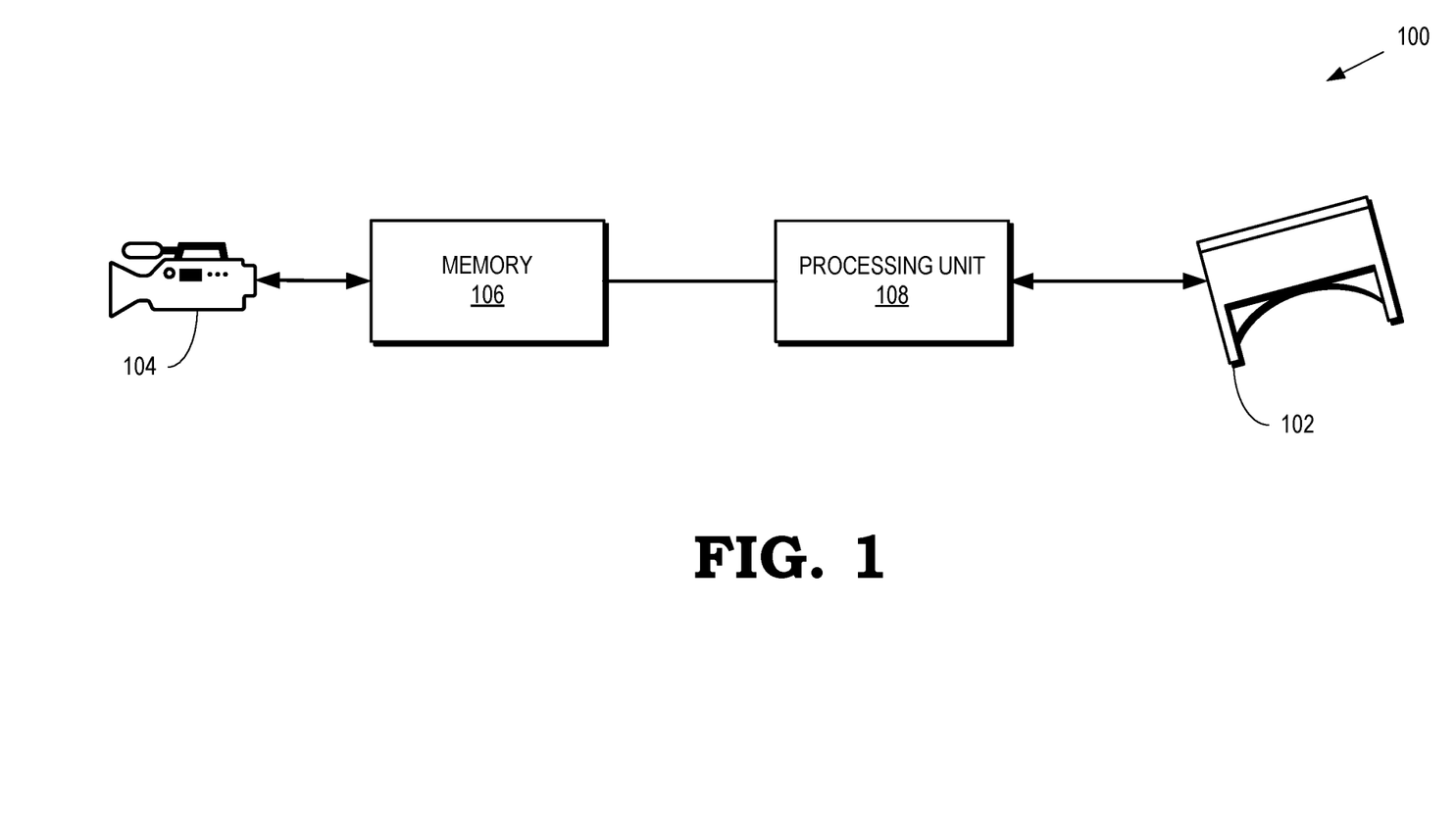
FIG. 1 is a diagram of an image acquisition and display system that supports immersive virtual reality (VR) or augmented reality (AR) functionality in accordance with some embodiments.

FIG. 1 is a diagram of an image acquisition and display system 100 that supports immersive virtual reality (VR) or augmented reality (AR) functionality according to some embodiments. Immersive VR and AR systems typically utilize an electronic device 102 that presents stereoscopic imagery to a user so as to give a sense of presence in a three-dimensional (3D) scene. In various embodiments, the electronic device 102 is designed to produce a stereoscopic image over various fields-of-view. For example, in some embodiments, the electronic device 102 is designed to produce a stereoscopic image over fields-of-view ranging, for example, from 90° to a field-of-view that approaches or is equal to the field-of-view of a human eye, which is approximately 180°. The illustrated embodiment of the electronic device 102 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 102 can include a fixture device, such as medical imaging equipment, a security imaging sensor system, an industrial robot control system, a drone control system, and the like. For ease of illustration, the electronic device 102 is generally described herein in the example context of an HMD system; however, the electronic device 102 is not limited to these example implementations.

The image acquisition and display system 100 includes an image acquisition device 104 that is used to acquire two-dimensional (2-D) images of a scene for presentation to a user via the electronic device 102. The image acquisition device 104 can include either or both of a physical image acquisition device, such as a camera, that acquires images of an actual scene, or a virtual image acquisition device 104 that generates images of a virtual scene such as a scene represented by a three-dimensional (3D) model. For example, if the electronic device 102 is supporting a VR application, the image acquisition device 104 can be a virtual image acquisition device 104 that generates images of the virtual scene for presentation to the user. For another example, if the electronic device 102 is supporting an AR application, the image acquisition device 104 can include both a physical image acquisition device to acquire an image of an actual scene as viewed from the perspective of the user and a virtual image acquisition device to generate a virtual image of a virtual scene. The image acquisition device 104 can then combine the virtual image and the actual image to create a composite AR image for presentation to the user.

The image acquisition and display system 100 includes one or more memories 106 that are used to store digital information representative of images acquired by the image acquisition device 104. The memory 106 can be implemented as dynamic random access memory (DRAM), non-volatile random access memory (NVRAM), flash memory, and the like. Some embodiments of the memory 106 also implement one or more caches for storing recently accessed information. The image acquisition and display system 100 also includes one or more processing units 108 that are configured to access information from the memory 106 and execute instructions such as instructions stored in the memory 106. The one or more processing units 108 can also store the results of the executed instructions in the memory 106. The one or more processing units 108 can include a central processing unit (CPU), a graphics processing unit (GPU), and the like. As discussed herein, the electronic device 102 can also include one or more processing units and memories. The operations described herein can therefore be executed by the electronic device 102, by the processing units 108, or the workload can be shared between the electronic device 102 and the processing units 108.

As discussed in further detail herein, the one or more of the processing units 108 and the electronic device 102 are configured to reduce the noticeability of aliasing artifacts in the low acuity regions by aligning the low acuity regions to content of the virtual world to be rendered for viewing. This is referring to as "world-aligning" the low acuity regions. As the electronic device 102 moves relative to virtual content (e.g., rotates due to user head movement), imagery presented in high acuity regions of imagery changes to match the rotational movement of the electronic device 102. However, the low acuity regions are world-aligned, where one or more of the processing units 108 and the electronic device 102 maintains the low acuity regions to be fixed relative to the virtual world's coordinates. The electronic device 102 projects and samples these world-aligned low acuity regions onto a final display surface (e.g., output image) to be presented at the electronic device 102. Thus, the electronic device 102 maintains the position of rendered pixels in the low acuity regions to be fixed in relative to the virtual scene and the electronic device 102. The position of artifacts in the periphery shift locations along with content as the user's field-of-view changes (e.g., due to movement of the user's head while wearing the electronic device 102), which is less detectable than artifacts that move against content.

Figure 2:
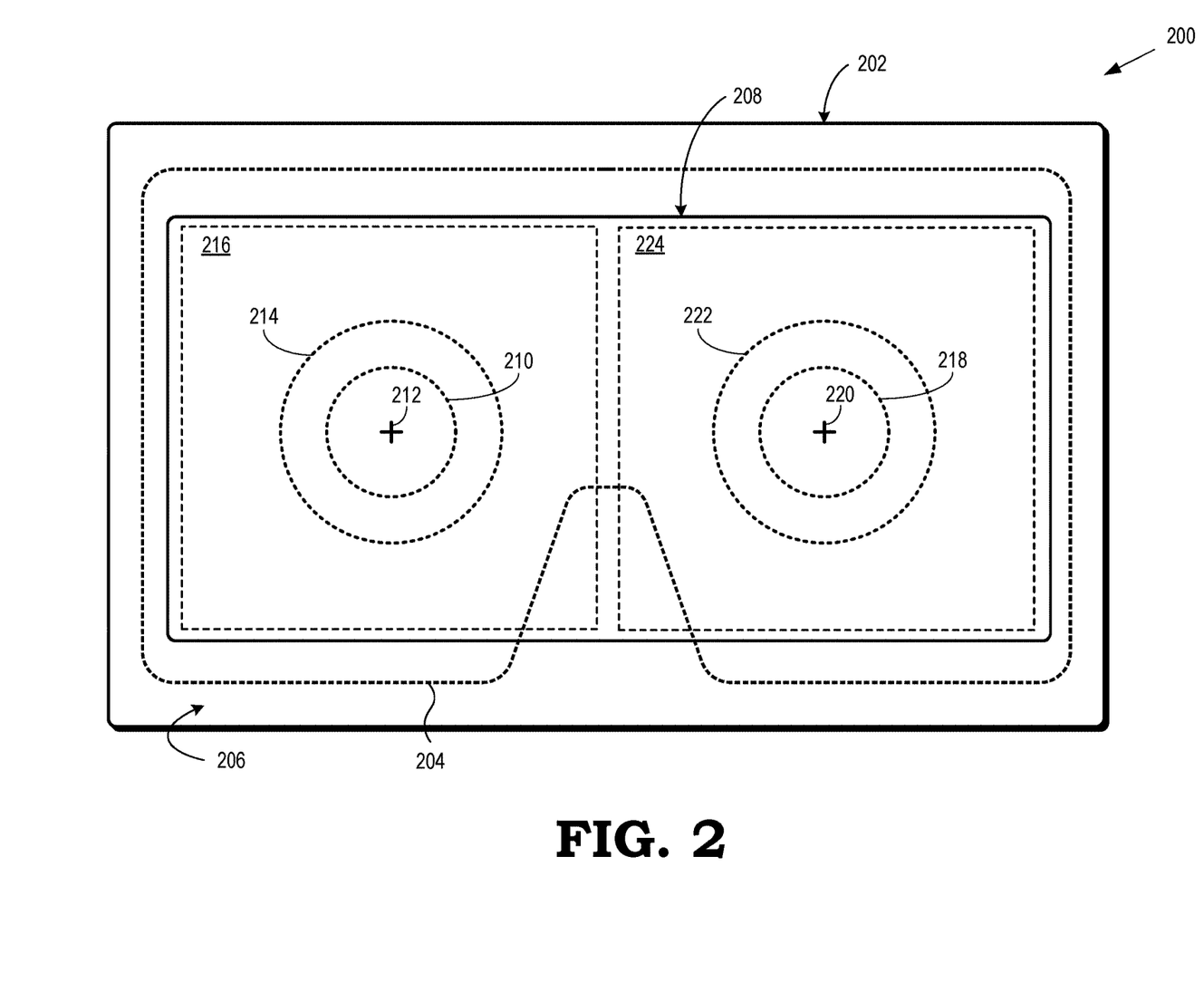
FIG. 2 illustrates a display system that includes an electronic device configured to provide immersive VR or AR functionality in accordance with some embodiments.

FIG. 2 illustrates a display system 200 that includes an electronic device 202 configured to provide immersive VR or AR functionality according to some embodiments. The electronic device 202 is used to implement some embodiments of the electronic device 102 shown in FIG. 1. A back plan view of an example implementation of the electronic device 202 in an HMD form factor in accordance with at least one embodiment of the present disclosure is shown in FIG. 2. The electronic device 202 can be implemented in other form factors, such as a smart phone form factor, tablet form factor, a medical imaging device form factor, a stand-alone computer, a system-on-a-chip (SOC), and the like, which implement configurations analogous to those illustrated. As illustrated by the back plan view, the electronic device 202 can include a face gasket 204 mounted on a surface 206 for securing the electronic device 202 to the face of the user (along with the use of straps or a harness).

The electronic device 202 includes a display 208 that is used to generate images such as VR images or AR images that are provided to the user. The display 208 is divided into two substantially identical portions, a right portion to provide images to the right eye of the user and a left portion to provide images to the left eye of the user. In other embodiments, the display 208 is implemented as two different displays, one dedicated to each eye. The electronic device 202 implements foveated rendering to present images to the user. The display 208 is therefore subdivided into different regions based on a distance from the user's center of gaze, e.g., the eccentricity. For example, the field-of-view for the user's left eye can be subdivided into a high-acuity region 210 that surrounds a central gaze direction 212. The field-of-view for the user's left eye is further subdivided into lower-acuity regions 214, 216 in the visual periphery. Similarly, the field-of-view for the user's right eye can be subdivided into a high acuity region 218 that surrounds a central gaze direction 220 and lower acuity regions 222, 224 in the visual periphery. The central gaze directions 212, 220 can be set equal to the center of a current field-of-view or they can be determined on the basis of eye tracking measurements that detect the central gaze direction of the user's eyes. In some embodiments, more or fewer lower acuity regions can be defined for the display 208.

Pixels are rendered at high resolution within the high-acuity regions 210, 218, e.g., by rendering the pixels at a resolution that is equal to the native resolution supported by the display. Pixels in the low-acuity regions 214, 216, 222, 224 are rendered at lower resolutions, thereby reducing the power and computing resources needed to render the pixels. The rendered pixels in the low-acuity regions 214, 216, 222, 224 are subsequently upsampled to generate display pixels at the native resolution of the display, e.g., using well-known interpolation techniques such as bilinear interpolation.

As further discussed relative to FIGS. 3-7, in various embodiments, the electronic device 202 reduces the noticeability of aliasing artifacts in the low acuity regions 214, 216, 222, 224 by aligning the low acuity regions 214, 216, 222, 224 to content of the virtual world to be rendered for viewing. This is referring to as "world-aligning" the low acuity regions 214, 216, 222, 224. As the electronic device 202 moves relative to virtual content (e.g., rotates due to user head movement), imagery presented in high acuity regions 210, 218 of imagery changes to match the rotational movement of the electronic device 202. However, the low acuity regions are world-aligned 214, 216, 222, 224, where the electronic device 202 maintains the low acuity regions to be fixed relative to the virtual world's coordinates. The electronic device 202 projects and samples these world-aligned low acuity regions onto a final display surface (e.g., output image) to be presented at the electronic device 202. Thus, the electronic device 202 maintains the position of rendered pixels in the low acuity regions to be fixed in relative to the virtual scene and the electronic device 202. The position of artifacts in the periphery shift locations along with content as the user's field-of-view changes (e.g., due to movement of the user's head while wearing the electronic device 202), which is less detectable than artifacts that move against content.

Figure 3:
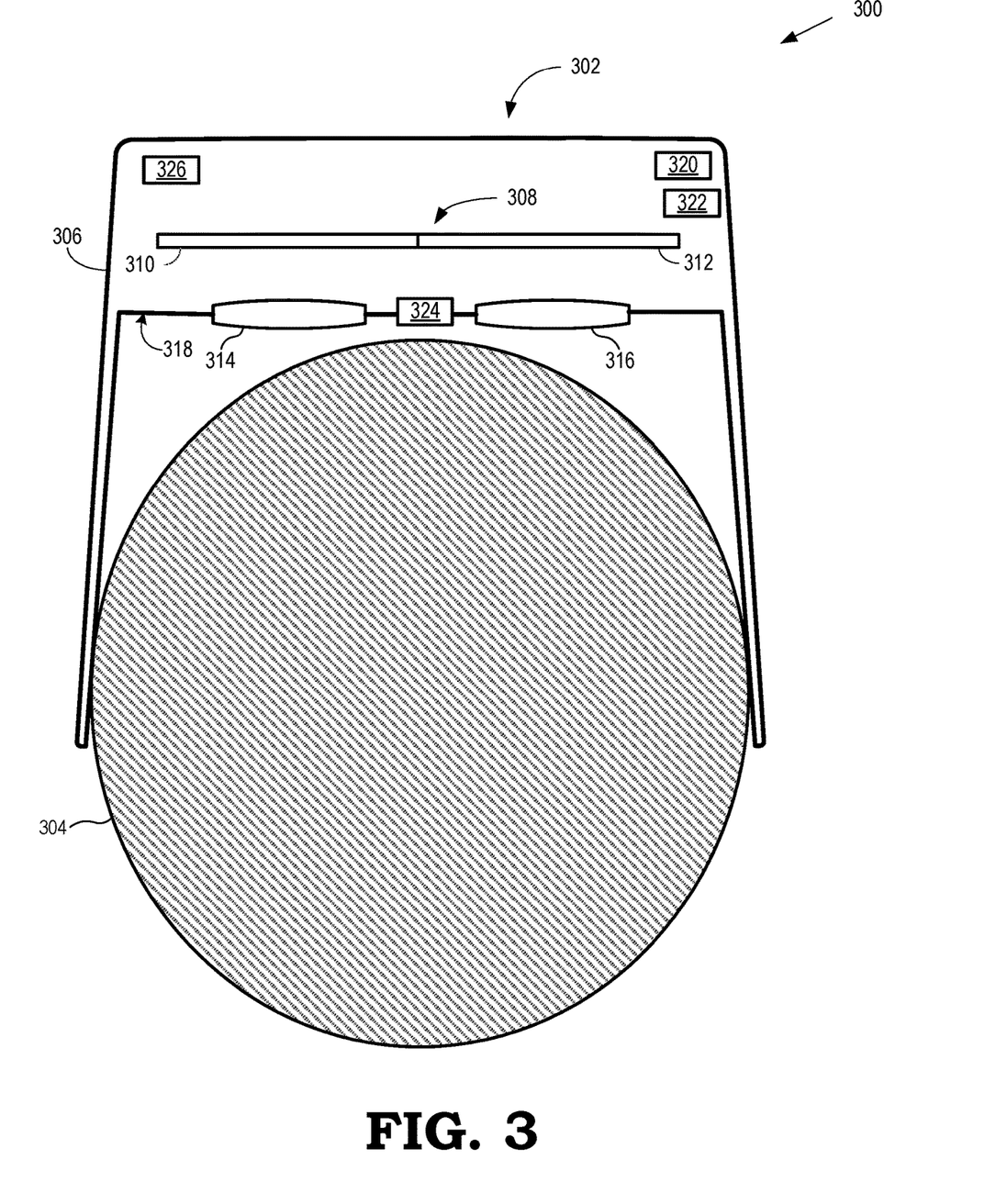
FIG. 3 illustrates a display system that includes an electronic device configured to provide AR or VR functionality to a user wearing the electronic device via a display in accordance with some embodiments.

FIG. 3 illustrates a display system 300 that includes an electronic device 302 configured to provide AR or VR functionality to a user wearing the electronic device 302 via a display according to some embodiments. The electronic device 302 is used to implement some embodiments of the electronic device 102 shown in FIG. 1 and the electronic device 202 shown in FIG. 2. The electronic device 302 is shown in FIG. 3 as being mounted on a head 304 of a user. As illustrated, the electronic device 302 includes a housing 306 that includes a display 308 that generates an image for presentation to the user. The display 308 is implemented using some embodiments of the display 208 shown in FIG. 2. In the illustrated embodiment, the display 308 is formed of a left display 310 and a right display 312 that are used to display stereoscopic images to corresponding left eye and right eye. However, in other embodiments, the display 308 is a single monolithic display 308 that generates separate stereoscopic images for display to the left and right eyes. The electronic device 302 also includes eyepiece lenses 314 and 316 disposed in corresponding apertures or other openings in a user-facing surface 318 of the housing 306. The display 308 is disposed distal to the eyepiece lenses 314 and 316 within the housing 306. The eyepiece lens 314 is aligned with the left eye display 310 and the eyepiece lens 316 is aligned with the right eye display 312.

In a stereoscopic display mode, imagery is displayed by the left eye display 310 and viewed by the user's left eye via the eyepiece lens 314. Imagery is concurrently displayed by the right eye display 312 and viewed by the user's right eye via the eyepiece lens 314. The imagery viewed by the left and right eyes is configured to create a stereoscopic view for the user. Some embodiments of the displays 308, 310, 312 are fabricated to include a bezel (not shown in FIG. 3) that encompasses outer edges of the displays 308, 310, 312. In that case, the lenses 314, 316 or other optical devices are used to combine the images produced by the displays 308, 310, 312 so that bezels around the displays 308, 310, 312 are not seen by the user. Instead, lenses 314, 316 merge the images to appear continuous across boundaries between the displays 308, 310, 312.

In some embodiments, some or all of the electronic components that control and support the operation of the display 308 and other components of the electronic device 302 are implemented within the housing 306. For example, the electronic device 302 can include a processing unit such as a GPU 320 and a memory 322. In some embodiments the workload associated with acquiring actual or virtual images and rendering these images for display on the display 308 can be shared with external processing units such as the processing unit 108 shown in FIG. 1. Some embodiments of the electronic device 302 include an eye tracker 324 to track movement of the user's eyes and determine a center of gaze for each eye in real-time. The electronic device 302 also includes one or more motion sensors 326. Examples of motion sensors 326 include accelerometers, gyroscopic orientation detectors, or other devices capable of detecting motion of the electronic device 302.

In the illustrated embodiment, the GPU 320 is configured to render pixels at different resolutions depending on an eccentricity from a center of gaze for the user. For example, the displays 310, 312 can be subdivided into high acuity regions and low acuity regions. The GPU 320 renders pixels in the high acuity regions at a higher resolution (e.g., at the native resolution of the display 310, 312) and renders pixels in the low acuity regions at lower resolutions. The GPU 320 then upsamples the rendered pixels to generate values of display pixels at the native resolution of the display 308 for presentation to the user. As discussed herein, a change in the user's field-of-view, e.g., due to movement of the user's head 304 while wearing the electronic device 302, changes the mapping of rendered pixels to the scene that the user is observing if the pattern of the rendered pixels is fixed relative to the display 308 in the electronic device 302. Thus, the value of each rendered pixel changes as it sweeps across the virtual scene, which can generate a corresponding time dependence in the aliasing artifacts. Generally, the amount of aliasing increases as the amount of upsampling increases.

Under traditional foveated rendering, both the low acuity and high acuity regions are updated with head-tracking information. Accordingly, any artifacts generated by aliasing due to upsampling the low acuity region will be aligned to the display coordinate system. Since imagery presented on display 308 moves with respect to the virtual world content, aliasing artifacts will also move relative to the content, causing jittering (i.e., during motion, artifacts move against content, which is very noticeable in the periphery). Thus, aliasing artifacts in the low-acuity regions are very noticeable due to head movement while viewing VR content and can disrupt the user's sense of immersion in the virtual scene.

The electronic device 302 reduces the noticeability of aliasing artifacts in the low acuity regions by aligning the low acuity regions to content of the virtual world to be rendered for viewing. This is referring to as "world-aligning" the low acuity regions. As the user's head 304 moves (e.g., rotates), imagery presented in the high acuity regions changes to match the rotational movement of the user's head 304. However, the low acuity regions are world-aligned, where the GPU 320 maintains the low acuity regions to be fixed relative to the virtual world's coordinates. The GPU 320 projects and samples these world-aligned low acuity regions onto a final display surface (e.g., output image) to be presented at the display 308. Thus, the GPU 320 maintains the position of rendered pixels in the low acuity regions to be fixed in relative to the virtual scene and the electronic device 302. The position of artifacts in the periphery shift locations along with content as the user's field-of-view changes (e.g., due to movement of the user's head 304 while wearing the electronic device 302), which is less detectable than artifacts that move against content. Accordingly, the phase offset between the low acuity region pixel sampling and the virtual world content is constant from frame to frame. Since the display moves relative to the world, the phase offset between the low acuity region pixels and the native resolution display 308 is aligned per frame to compensate.

After rendering the lower resolution pixels in the low acuity regions and upsampling the rendered pixels to generate values of the display pixels in the low acuity regions of an output image for presentation by the display 308, artifacts are still present within the output image. The world-aligning of the low acuity regions does not eliminate the presence of artifacts or reduce the severity of artifacts within each static image, but instead reduces the perceptibility of peripheral artifacts. Instead, the position of artifacts in the periphery shift locations along with content as the user's field-of-view changes, such that artifacts are less noticeable to the user. The perceptibility of aliasing in the periphery of the display 308 is reduced if the aliasing does not contribute to dynamic jitter under motion.

Figure 4:
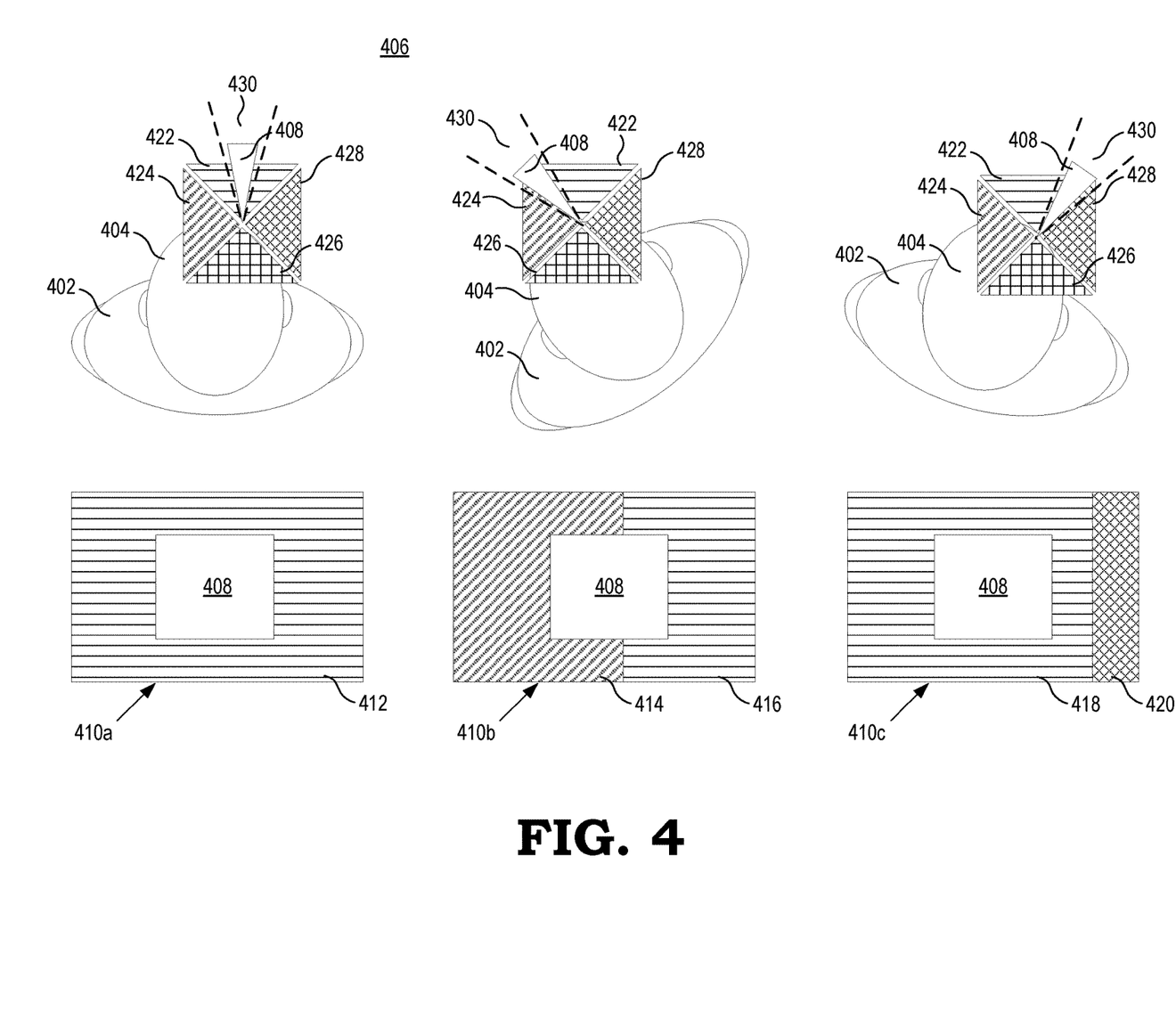
FIG. 4 is a block diagram illustrating top-down views of world-aligning low acuity regions in accordance with some embodiments.

FIG. 4 is a block diagram illustrating top-down diagrams of world-aligning low acuity regions in accordance with some embodiments. As shown, a user 402 is positioned relative to a virtual scene 406. As the head 404 of the user 402 moves (e.g., rotates or by turning the whole body as illustrated in FIG. 4), the high acuity region 408 of an output display image changes to match the rotational movement of the user's head 404. However, the low acuity regions (e.g., low acuity regions 412, 414, 416, 418, 420 of display images 410a, 410b, and 410c, respectively) are fixed with respect to world coordinates of the virtual scene 406.

In the embodiment of FIG. 4, the low acuity regions are rendered relative to the six sides a world-aligned cube (not shown). Each surface of the world-aligned cube being rendered to is associated with an abstract camera position that represents a location of a user looking at the virtual scene 406. Each abstract camera position defines a viewing frustum that encloses objects of the virtual scene 406. As shown in FIG. 4, the viewing frustums 422, 424, 426, and 428 define four low acuity regions that together cover a full 360-degree view around the user 402. That is, each of the viewing frustums 422, 424, 426, and 428 define a low acuity render screen representing one of the surfaces of the world-aligned cube. It should be appreciated that although only four viewing frustums are provided in FIG. 4 for ease of illustration, a total of six viewing frustums for the low acuity regions are needed to cover all faces of the world-aligned cube in a 3D system, per eye of the user.

As shown in FIG. 4, as the user 402 rotates, the high acuity region 408 matches the rotational movement of the user's head 404. For example, in various embodiments, the high acuity field of view is head-tracked and/or eye-tracked (e.g., using eye tracker 324 and motion sensors 326 of the electronic device 302 of FIG. 3). However, each of the viewing frustums 422, 424, 426 and 428 is fixed with respect to world coordinates of the virtual scene 406. The low acuity fields of view are aligned to world coordinates and reprojected onto display coordinates during upsampling. That is, although the user's head 404 may rotate, the viewing frustums 422, 424, 426 and 428 remain stationary relative to the virtual scene 406. Accordingly, these viewing frustums may be interchangeably referred to as "fixed viewing frustums" as they are fixed in orientation relative to the virtual scene 406. Processors of the electronic device, such as GPU 320 of FIG. 3, reproject and resample the low acuity render screens defined by the viewing frustums 422, 424, 426 and 428 onto a final display surface (e.g., output display images 410a, 410b, and 410c). Accordingly, the phase offset between the pixels in the low acuity regions and native-resolution pixels are dynamic from frame-to-frame, always ensuring each low-acuity pixel is phase-aligned with the virtual world content in the virtual scene 406.

Although the phase aligned foveated rendering (PAFR) described here is performed with six separate render screens for the low acuity region, it should be appreciated that if each of these six render screens were processed for each display image, a large performance penalty would be incurred. However, by rendering only the screens that will actually be used in a current frame to be displayed, the cost to perform PAFR is reduced. Accordingly, to decrease computation load associated with foveated rendering using these world-aligned low acuity regions, not all of the low acuity regions encompassed by the viewing frustums 422, 424, 426 and 428 are rendered to and presented for each frame. Instead, only the low acuity regions that overlap with the output field of view 430 (i.e., field-of-view of the final display image presented to the user) are rendered. Any virtual object entirely outside of the viewing frustum(s) overlapping with the output field of view 430 is culled (i.e., discarded) because the virtual object will not contribute to the final rendered image. Any virtual object that is partially inside the viewing frustum and partially outside the viewing frustum is clipped (i.e., transformed into a new geometric primitive that is enclosed within the viewing frustum). Accordingly, even though the various perspective views of virtual scene 406 are encompassed by six viewing frustums, only a subset of those are rendered for any given frame, depending on the output field of view 430 of the headset (e.g., a HMD) worn by the user 402.

For example, as illustrated in the example on the left of FIG. 4, the output field of view 430 overlaps only with fixed viewing frustum 422. To generate values of display pixels for the low acuity portion of display image 410a, only the view represented by fixed viewing frustum 422 is rendered to generate a world-aligned, low acuity region render screen. The pixels of that world-aligned, low acuity region render screen are subsequently reprojected and resampled onto the final display image (i.e., display image 410a). Accordingly, all pixels in the low acuity region 412 of display image 410a originate from the low acuity region render screen represented by fixed viewing frustum 422.

In contrast, as illustrated in the middle and right examples of FIG. 4, the output field of view 430 overlaps with multiple viewing frustums. It should be appreciated that although the user's head 404 rotates, the viewing frustums 422, 424, 426, and 428 remain fixed relative to the virtual scene. For the middle example, the output field of view 430 overlaps with fixed viewing frustums 422, 424. To generate values of display pixels for the low acuity portion of display image 410b, views represented by both the fixed viewing frustums 422, 424 are rendered to generate low acuity region render screens. The pixels of those world-aligned, low acuity region render screens are subsequently reprojected and resampled onto the final display image (i.e., display image 410b). As illustrated in FIG. 4, the pixels in the low acuity region 414 of display image 410b originate from the low acuity region render screen represented by fixed viewing frustum 424 and the pixels in the low acuity region 416 of display image 410b originate from the low acuity region render screen represented by fixed viewing frustum 422.

Similarly, with respect to the example on the right side of FIG. 4, the output field of view 430 overlaps with fixed viewing frustums 422, 428. To generate values of display pixels for the low acuity portion of display image 410c, views represented by both the fixed viewing frustums 422, 428 are rendered to generate low acuity region render screens. The pixels of those world-aligned, low acuity region render screens are subsequently reprojected and resampled onto the final display image (i.e., display image 410c). As illustrated in FIG. 4, the pixels in the low acuity region 418 of display image 410c originate from the low acuity region render screen represented by fixed viewing frustum 422 and the pixels in the low acuity region 420 of display image 410c originate from the low acuity region render screen represented by fixed viewing frustum 428.

Therefore, only the subset of all available fixed frustums that overlap with the output field of view 430 are used for low acuity region rendering.

The world-aligning of the low acuity regions as illustrated and described here with respect to FIG. 4 does not eliminate the presence of artifacts or reduce the severity of artifacts within each static image, but instead reduces the perceptibility of peripheral artifacts. By world-aligning the low acuity render screens, rendered pixels in the low acuity regions are positioned at fixed orientations relative to the virtual scene 406. After upsampling to generate display pixels at the native-resolution of the display, artifacts will still be present within the periphery output display image (e.g., display images 410a, 410b, and 410c). However, the positions of those artifacts shift locations along with content as the user's field-of-view changes (e.g., due to movement of the user's head 404 while wearing an HMD), which is less detectable than artifacts that move against content. Because aliasing becomes less perceptible in the periphery if it does not contribute to dynamic jitter under motion, the phase alignment described herein reduces flickering of artifacts caused by head rotation (i.e., 3-DoF motion). Thus, the phase aligned foveated rendering described herein yields improvements in visual quality for configurations where a large downsampling factor is used for foveated rendered, especially for systems using eye tracking having optics configurations that result in substantial loss of acuity with eccentricity.

Those skilled in the art will recognize that although phase-aligned foveated rendering is described here in the context of a single low acuity region of a single resolution and a single high acuity region for ease of description, the techniques described herein are compatible with using any number of low acuity regions of varying resolutions. Those skilled in the art will additionally recognize that the embodiment of FIG. 4 is described relative to a world-aligned cube, in other embodiments, additional viewing frustums may be used, such as to form the outside surfaces of various viewing polyhedrons without departing from the scope of this disclosure.

The embodiment of FIG. 4 renders only to low acuity render screens that contribute to the final display image to minimize computations associated with rendering to multiple world-aligned screens. That is, low acuity render screens are removed from the rendering pipeline (for each output frame) if the low acuity render screens are not in the field of view of the output display. The computational load may further be reduced by rendering only the portion of each low acuity region render screen that overlaps with the output display field of view.

Figure 5:
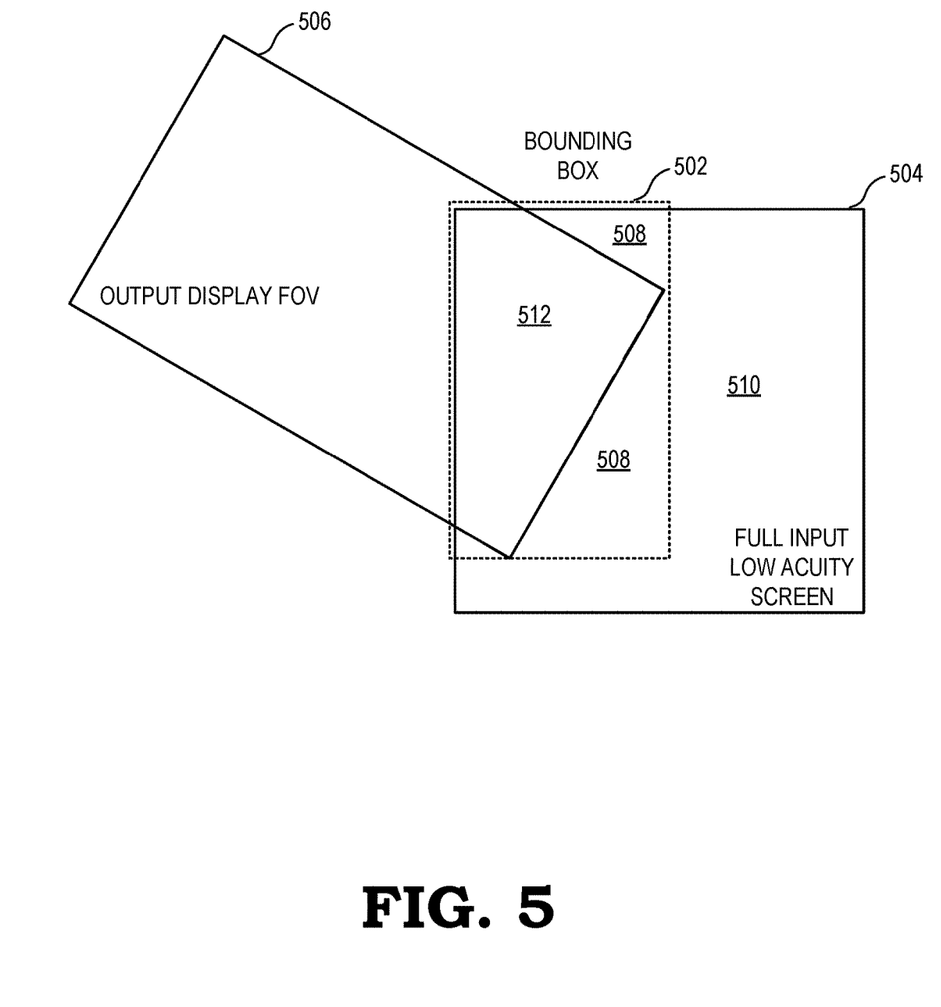
FIG. 5 is a block diagram illustrating an optimization of pixel rendering in low acuity regions in accordance with some embodiments.

FIG. 5 is a block diagram illustrating an optimization of pixel rendering in low acuity regions in accordance with some embodiments. As discussed above relative to FIG. 4, not all six of the low acuity screens (representing the six sides of the world-aligned cube) are used to render each output display frame. Instead, only a subset of the low acuity screens that overlap in the field of view of the output display are used (e.g., output field of view 430). Typically, two or three low acuity screens are used per output display frame, depending on how the user has oriented their head.

It should be appreciated that each of the low acuity screens that are rendered to will not need an entirety of that screen's pixels, as only a part of each low acuity screen will overlap with the output display image. Accordingly, in some embodiments, a scissor-box culling operation is performed on each low acuity screen to identify a scissor box representing a subset of each low acuity screen's pixels that will be shown in the final display. As shown in FIG. 5, the scissor box is an axis-aligned bounding box 502 defined in the low acuity screen 504. In various embodiments, the axis-aligned bounding box 502 represents a superset of the reprojection of the output display image 506 onto the low acuity screen 504. As the axis-aligned bounding box 502 is aligned with the axes (not shown) of low acuity screen 506, the axis-aligned bounding box 502 includes at least some excess pixels 508 that are computed but not presented for display in the output display image 506.

Those skilled in the art will recognize that although the diagram of FIG. 5 illustrates a scissor operation for a single low acuity screen 504, the same scissor operation is performed for each of the low acuity screens being rendered to for a given frame. The result is a final output image (i.e., output display image 506) that looks as if no scissor operations were performed, but is computationally more efficient by skipping the rendering of pixels outside of the axis-aligned bounding box 502 (i.e., pixels 510 which do not overlap with the field of view of the output display image 506). That is, although the full input low acuity screen 504 is identified as overlapping with the output display image 506, pixels 510 are not rendered since they are not needed for the final output display image 506. By rendering only the portions of the low acuity screens that are within the field of view of the output display, the computational load associated with phase aligned foveated rendering is reduced.

In some embodiments, rather than computing a scissor box (i.e., axis-aligned bounding box 502 of FIG. 5), only the pixels within the low acuity screens that actually overlap with the final output display image (e.g., pixels 512) are rendered and subsequently upsampled. In other embodiments, various other mechanisms are used to cull portions of the low acuity screens such that they are not rendered. For example, depth-mask culling and/or stencil-mask culling may also be used to reduce the amount of pixels identified in each low acuity screen to be rendered.

Figure 6:
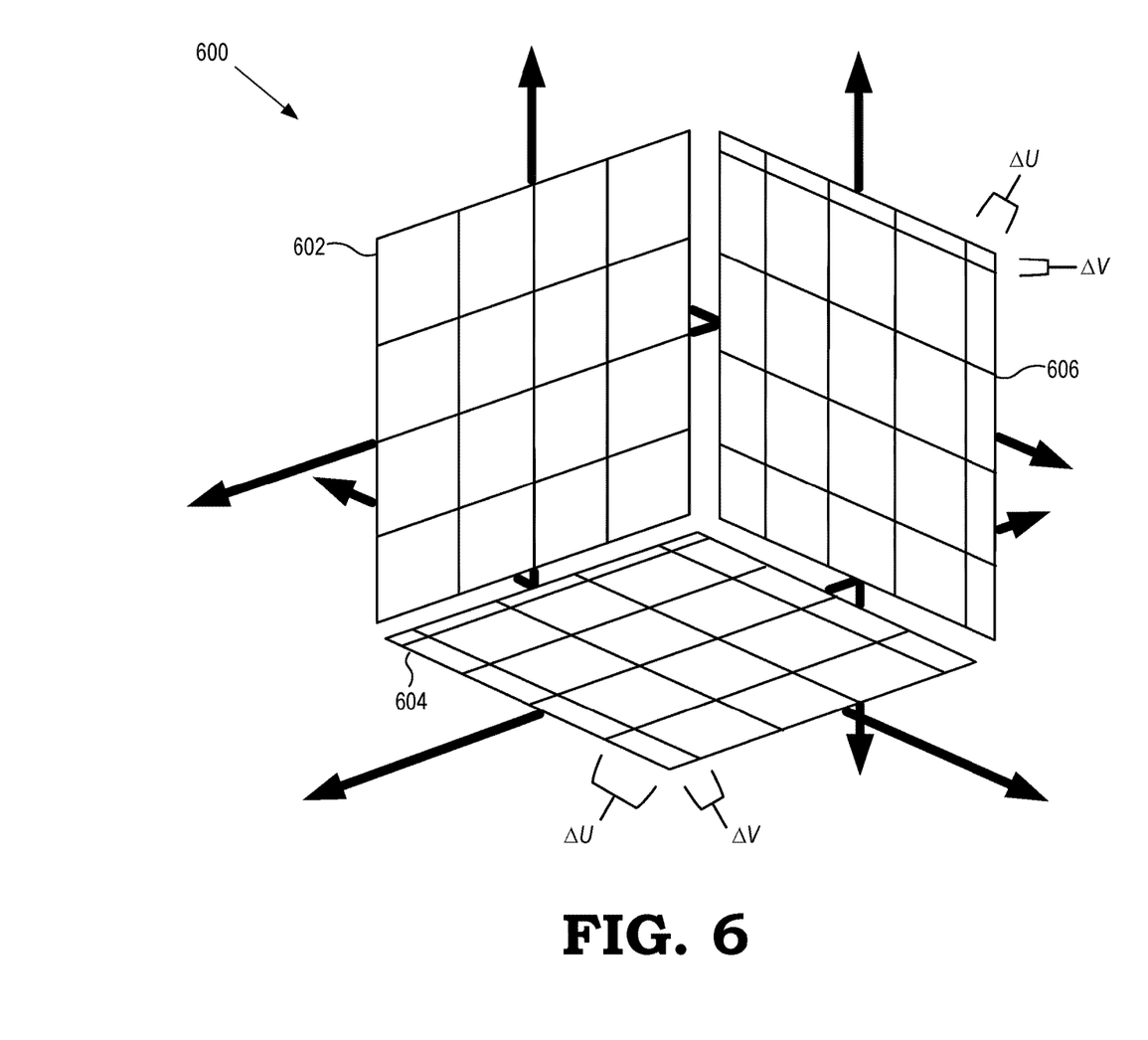
FIG. 6 is a diagram illustrating a side perspective of phase shifting a world-aligned cube in accordance with some embodiments.

FIG. 6 is a diagram illustrating a side perspective of phase shifting a world-aligned cube in accordance with some embodiments. Since users tend to rotate their heads and translate at least a little bit at any given time, phase aligned foveated rendering also reduces flicker caused by translational motion. However, as described below, PAFR reduces flickering caused by moving laterally relative to the optical axis of each low acuity screen, but does not affect flickering cause by moving along the optical axis of the low acuity screen. As discussed with respect to FIG. 3, phase aligned foveated rendering by rendering low acuity screens to the sides of a world-aligned cube reduces flickering of peripheral artifacts caused by head rotation (e.g., 3-DoF motion). As the user's head rotates with respect to the rendered content, they also rotate with respect to that cube's alignment and therefore the aliasing is aligned to the world, reducing flicker.

In other embodiments, phase aligned foveated rendering is also applied to systems with motion tracking in additional directions. Flickering due to lateral translation is reduced by shifting the phase offset of each cube face along its tangent plane. As illustrated in FIG. 6, the low acuity screens 602, 604, and 606 of world-aligned cube 600 may each be shifted by a phase offset (i.e., ΔU and/or ΔV along the plane of each low acuity screen. The phase offset of the pixels changes as the user translates in the corresponding directions, matching their movement.

Each low acuity screen 602, 604, and 606 has its own corresponding offset, that is updated based on the user's lateral movements relative to that particular screen. The amount of phase shift required for each screen 602, 604, and 606, in some embodiments, is computed based on the following equations (1) and (2):

$$\begin{bmatrix} \Delta U \\ \Delta V \end{bmatrix} = \vec{p} - \lfloor \vec{p} \rfloor, \quad (1)$$

$$\vec{p} = \left( \begin{bmatrix} 1 & 0 & 0 \\ 0 & 1 & 0 \end{bmatrix} T_{s \to w}^T \vec{t}_{w \to e} \right)^T \begin{bmatrix} \dfrac{W}{\tan\theta_L + \tan\theta_R} \\ \dfrac{H}{\tan\theta_U + \tan\theta_D} \end{bmatrix} \quad (2)$$

$$\left( \dfrac{1}{[0\ 0\ 1] T_{s \to w}^T \vec{t}_{w \to e} - \rho_{wall}} \right)$$

where $T_{S \to W}$ represents the homomorphic transform between normalized screen coordinates and 3D world coordinates; $t_{w \to e}$ represents a translation from the origin of the world coordinate system to the current eye position; W, H represent the width and height of the low acuity screen, respectively, in units of pixels; $\theta_L$, $\theta_R$, $\theta_U$, $\theta_D$ represent the left, right, up, and down field of view angles, respectively, for this screen (e.g., for the low-acuity screens of a six-sided cube, all of these angles are 45 degrees); and $\rho_{wall}$ represents an assumed depth of the scene along the optical axis of the screen, in units of distance.

The translation value of <$\Delta U$, $\Delta V$> is in units of pixels, and will be no more than a fraction of a pixel in each direction. This shift aligns the pixel grid of each low acuity screen 602, 604, and 606 to match the lateral translation of the user. This phase shift determination assumes knowledge of the depth of the virtual scene in each direction and assumes that the scene depth is uniform over the entirety of each side, as denoted by $\rho_{wall}$. This assumption is valid when facing, for example, a flat wall. However, a virtual scene having many depth changes will still flicker in certain locations (e.g., when looking at a virtual scene of a long hallway). In some embodiments, where the depth is unknown or the depth is non-constant, an infinite value can be assumed for $\rho_{wall}$, in which case the value of <$\Delta U$, $\Delta V$> goes to zero and the embodiment reverts to the same visualization as the 3-DoF embodiment of phase-aligned foveated rendered as described relative to FIG. 4. In other embodiments, the depth can be derived a number of ways, such as by taking the average depth from the application's rendering, a fixed depth set ahead of time (for instance, by the VR play area), or a predetermined depth map delivered from the application layer.

Accordingly, in addition to each face of the world-aligned cube 600 (e.g., low acuity screens 602, 604, and 606 viewable in FIG. 6) being reprojected from world coordinates onto output display coordinates, phase aligned foveated rendering may also include updating the lateral phase offset of each face's pixels based on the user's translation movement (e.g., such as by determined by motion sensors 326 in the electronic device 302 of FIG. 3). This additional lateral phase offset computation only requires one extra row and column of pixels for each low acuity screen 602, 604, and 606, since the offset value is always a fraction of a pixel in each direction. In various embodiments, this lateral phase offset computation is performed after the low acuity screens overlapping with the final display output are identified, but prior to rendering the pixels of those identified low acuity screens. Accordingly, extending the phase aligned foveated rendering of FIG. 4 to 5-DoF (3-DoF due to head rotation and 2-DoF due to head translation) only results in a small net computation cost.

Figure 7:
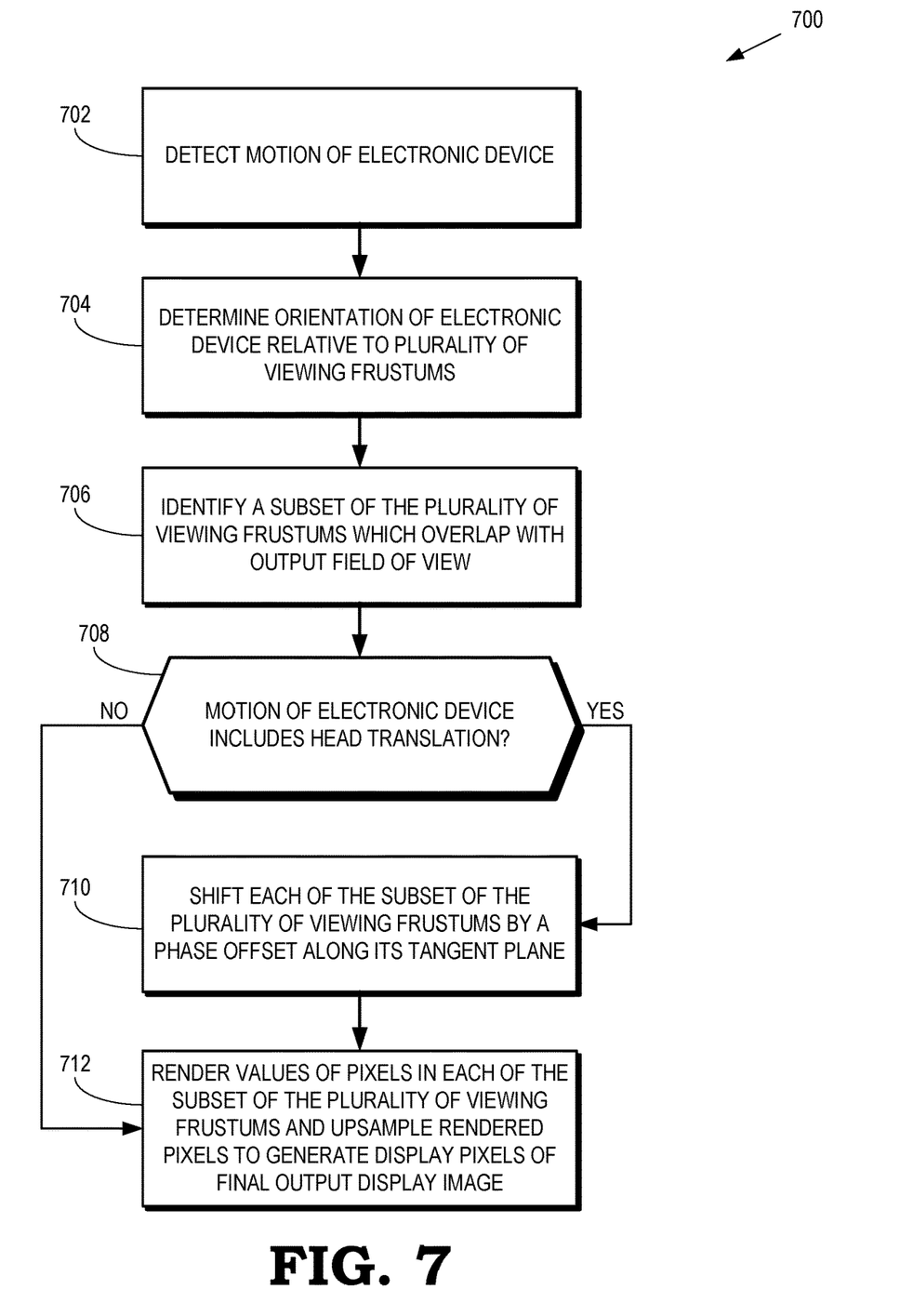
FIG. 7 is a block diagram illustrating a method of rendering display pixels representative of a virtual scene using phase aligned foveated rendering in accordance with some embodiments.

FIG. 7 is a flow diagram illustrating a method 700 of rendering display pixels representative of a virtual scene using phase aligned foveated rendering in accordance with some embodiments. The method 700 is implemented in some embodiments of an electronic device such as the electronic device 102 shown in FIG. 1, the electronic device 202 shown in FIG. 2, the electronic device 302 shown in FIG. 3. It should be appreciated that the method of 700 is performed for a first eye of the user for ease of illustration and the same method 700 may be performed for a second eye of the user to generate stereoscopic images for display.

At block 702, a motion tracker implemented in the electronic device (e.g., accelerometers, gyroscopic orientation detectors, or other devices capable of detecting motion as described relative motion trackers 326 of FIG. 3) detects motion of the electronic device, e.g., due to movement of the head of the user wearing the electronic device. In some embodiments, the motion tracker detects rotational movement of the head of the user. In other embodiments, the motion tracker detects both rotational movement and translational movement of the head of the user.

At block 704, a processing unit in the electronic device identifies, in response to detecting the motion, an orientation of the display device relative to a plurality of fixed viewing frustums. In various embodiments, such as described above relative to FIGS. 4-6, the plurality of fixed viewing frustums represent six low acuity screens corresponding to the faces of a virtual world-aligned cube. Thus, the plurality of fixed viewing frustums are stationary relative to a virtual scene to be rendered for display. In other embodiments, the plurality of fixed viewing frustums correspond to outside surfaces of various viewing polyhedrons having fewer or more surfaces than a world-aligned cube.

At block 706, the processing unit determines, based on the orientation of the electronic device identified in block 704, a subset of the plurality of fixed viewing frustums which overlap with an output field of view of the electronic device. For example, as illustrated in the example on the right side of FIG. 3, only the two fixed viewing frustums 422 and 428 overlap with the output field of view 430. In some embodiments, the processing unit also determines a portion of the array of pixels for each of the subset of the plurality of the fixed viewing frustums that overlap with the output field of view. For example, as discussed in more detail relative to FIG. 5, only a subset of the low acuity screens that overlap in the field of view of the output display are used. By identifying a reduced set of pixels (e.g., a portion of the pixels for each fixed viewing frustum that are within the field of view of the output display), the computational load associated with phase aligned foveated rendering is reduced.

At block 708, the processing unit determines, based on the motion detected in block 702, whether motion of the electronic device includes translation movement of the user's head. If the motion includes translational movement, the method 700 proceeds to optional block 710, at which the processing unit shifts each of the subset of overlapping viewing frustums identified at block 706 by a phase offset to shift each fixed viewing frustums along its tangent plane. As described in more detail relative to FIG. 6, this phase offset shift includes translating the array of pixels associated with each viewing frustum based on the translational movement of the user's head. If the processing unit unit determines at block 708 that the motion detected in block 702 only includes rotational movement and does not include any translational movement, the method 700 proceeds to block 712.

At block 712, a processor of the electronic device (e.g., a graphics processor unit) renders an array of pixels for each of the subset of the plurality of fixed viewing frustums identified at block 706 to overlap with the final output display image. The rendered array of pixels have a resolution that is lower than a native resolution of a display in the electronic device. For example, the rendered pixels can represent portions of the field-of-view that are in low acuity regions such as the low acuity regions 214, 216, 222, 224 shown in FIG. 2. In some embodiments discussed herein, the rendering of the array of pixels for each of the subset of the plurality of fixed viewing frustums includes rendering only pixels for portions of each fixed viewing frustum that overlaps with the final output display image. For example, such as described with respect to FIG. 5, a scissor operation is performed to identify an axis-aligned bounded box within the low acuity screen associated with each fixed viewing frustums to identify pixels which overlap with the field of view of the final output display image.

Subsequently, the processor of the electronic device upsamples the rendered array of pixels of block 712 to generate values of display pixels for presentation in the final output display image by a display in the processing unit. For example, the rendered pixels can be upsampled to the native resolution of the display. In some embodiments, the rendered pixels are upsampled in a coordinate system that is fixed relative to the virtual scene. The display pixels should therefore be translated to compensate for any offset between the coordinate system that is fixed relative to the virtual scene and a coordinate system of the display. In this manner, the low acuity screens that make up the low acuity regions are upsampled and the display pixel values are merged with display pixels of a high acuity screen (not discussed herein) to generate a merged, full-resolution image. This full resolution image is passed to the output display to be presented to the user. The method 700 then flows to block 702 and the motion tracker continues to monitor motion of the electronic device.

Because the pixel rendering of block 712 is performed from only a limited number of perspectives (i.e., six for a world-aligned cube), upsampling the values of those rendered pixels will create the same pattern of aliasing artifacts within each low acuity screens. Accordingly, by rendering to world-aligned virtual screens before upsampling and reprojecting onto the final display coordinates, visible artifacts will move along with the rotational movement of the user's head. This reduces the perceptibility of motion artifacts and jittering caused by rotational head movement. This phase aligned foveated rendering operates independently from any upsampling, smoothing, or filtering algorithms that may be subsequently applied after phase alignment to improve image quality. Accordingly, the PAFR described herein can be used to complement any image processing used to improve virtual scene rendering, since it operates on a different aspect of the pipeline. Additionally, reducing the number of pixels that need to be rasterized, PAFR reduces computational load, saving time and power per image frame.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   detecting, using a motion tracker, motion of a display device configured to display a virtual scene;

changing a high acuity region to match the motion of the display device;
determining, in response to detecting the motion, an orientation of the display device relative to a plurality of fixed viewing frustums, wherein the plurality of fixed viewing frustums are stationary relative to the virtual scene, wherein the plurality of fixed viewing frustums is defined by abstract camera positions that represent locations of a user viewing the virtual scene, and wherein the plurality of fixed viewing frustums encloses objects of the virtual scene;
determining, based on the orientation of the display device, a subset of the plurality of fixed viewing frustums overlapping with an output field of view of the display device;
rendering an array of pixels based on the high acuity region and the subset of the plurality of the fixed viewing frustums overlapping with the output field of view; and
upsampling, at a processor, at least a portion of the array of pixels for each of the subset of the plurality of the fixed viewing frustums to generate values of display pixels for presentation by the display device.

2. The method of claim 1, wherein upsampling at least the portion of the array of pixels for each of the subset of the plurality of the fixed viewing frustums comprises:
interpolating values of the array of pixels associated with the plurality of fixed viewing frustums from a lower resolution to generate the values of the display pixels having a higher resolution that is equal to a native resolution of the display device.

3. The method of claim 1, rendering an array of pixels for each of the subset of the plurality of the fixed viewing frustums comprises:
rendering only the array of pixels for portions of each fixed viewing frustum that overlaps with the output field of view.

4. The method of claim 1, further comprising:
merging, into a single image, the values of display pixels generated for each of the subset of the plurality of the fixed viewing frustums to generate the output field of view.

5. The method of claim 1, further comprising:
translating, based on the detected motion, the array of pixels in each of the subset of the plurality of fixed viewing frustums.

6. The method of claim 5, wherein translating the array of pixels comprises:
shifting a phase offset of each of the subset of the plurality of fixed viewing frustums along its tangent plane prior to upsampling the array of pixels for display.

7. The method of claim 1, further comprising:
corresponding each of the plurality of fixed viewing frustums to a low acuity screen of a world-aligned viewing cube.

8. An apparatus, comprising:
a display configured to present a virtual scene represented by display pixels;
a motion tracker configured to detect motion of the apparatus; and
a processor configured to change a high acuity region to match the motion of the apparatus, determine, based on motion detected by the motion tracker, an orientation of the apparatus relative to a plurality of fixed viewing frustums which are stationary relative to the virtual scene, determine a subset of the plurality of fixed viewing frustums overlapping with an output field of view of the apparatus, render an array of pixels based on the high acuity region and the subset of the plurality of fixed viewing frustums overlapping with the output field of view, and upsample at least a portion of the array of pixels for each of the subset of the plurality of the fixed viewing frustums to generate values of display pixels for presentation by the display,
wherein the plurality of fixed viewing frustums is defined by abstract camera positions that represent locations of a user viewing the virtual scene, and wherein the plurality of fixed viewing frustums encloses objects of the virtual scene.

9. The apparatus of claim 8, wherein the processor is configured to generate the values of the display pixels by interpolating values of the array of pixels associated with the plurality of fixed viewing frustums from a lower resolution to generate the values of the display pixels having a higher resolution that is equal to a native resolution of the display.

10. The apparatus of claim 8, wherein the processor is configured to render only the array of pixels for portions of each fixed viewing frustum that overlaps with the output field of view.

11. The apparatus of claim 8, wherein the processor is configured to merge, into a single image, the values of display pixels generated for each of the subset of the plurality of the fixed viewing frustums to generate the output field of view.

12. The apparatus of claim 8, wherein the processor is configured to translate, based on the detected motion, the array of pixels in each of the subset of the plurality of fixed viewing frustums.

13. The apparatus of claim 8, wherein the processor is configured to shift each of the subset of the plurality of fixed viewing frustums by a phase offset along its tangent plane prior to upsampling the array of pixels for display.

14. The apparatus of claim 8, wherein the processor is configured to correspond each of the plurality of fixed viewing frustums to a low acuity screen of a world-aligned viewing cube.

15. A method for implementation in a head mounted device (HMD) configured to display a representation of a virtual scene, comprising:
determining an orientation of the HMD relative to a plurality of low acuity screens that are stationary relative to the virtual scene, wherein the low acuity screens represent surfaces of a world-aligned cube that encompasses a user of the HMD;
determining, based on the orientation of the HMD, a subset of the low acuity screens overlapping with an output field of view of the display device;
rendering an array of pixels based on the subset of the plurality of the low acuity screens overlapping with the output field of view and a high acuity region that moves to match motion of the HMD; and
upsampling, at a processor, at least a portion of the array of pixels for each of the subset of the low acuity screens to generate values of display pixels for presentation by the display device.

16. The method of claim 15, wherein upsampling at least the portion of the array of pixels for each of the subset of the plurality of the low acuity screens comprises:
interpolating values of the array of pixels associated with the subset of the low acuity screens from a lower resolution to generate the values of the display pixels having a higher resolution that is equal to a native resolution of the display device.

17. The method of claim 15, rendering an array of pixels for each of the subset of the plurality of the low acuity screens comprises:
- rendering only the array of pixels for portions of each low acuity screen that overlap with the output field of view.

18. The method of claim 15, further comprising:
- merging, into a single image, the values of display pixels generated for each of the subset of the plurality of the low acuity screens to generate the output field of view.

19. The method of claim 15, further comprising:
- translating, based on the determined orientation of the HMD, the array of pixels in each of the subset of the plurality of low acuity screens.

20. The method of claim 19, wherein translating the array of pixels comprises:
- shifting each of the subset of the plurality of low acuity screens by a phase offset along its tangent plane prior to upsampling the array of pixels for display.

\* \* \* \* \*